Figure 1:
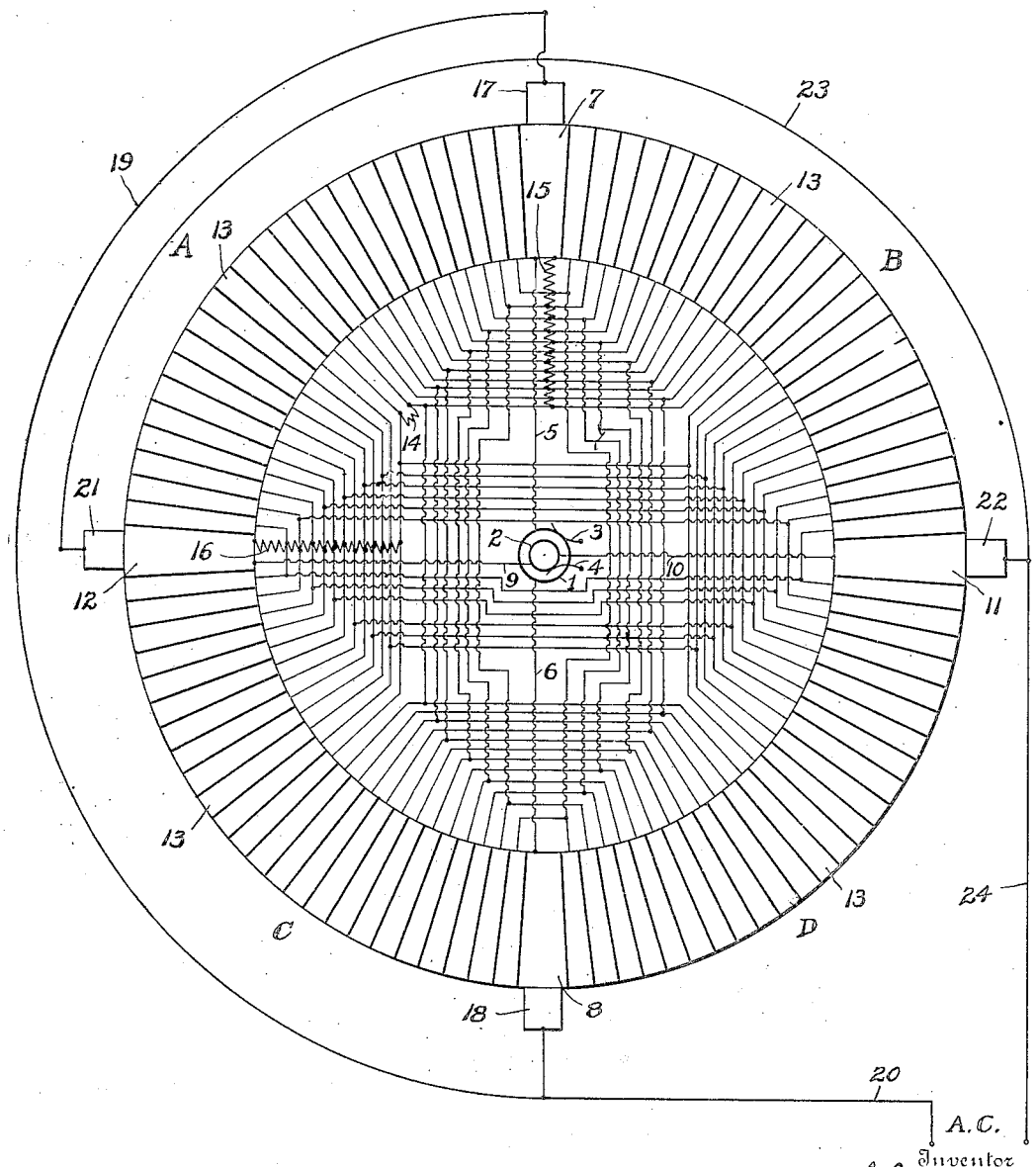

H. SHOEMAKER.
CONVERTER.
APPLICATION FILED DEC. 20, 1906.

899,629.

Patented Sept. 29, 1908.
2 SHEETS—SHEET 1.

Witnesses
Danl Webster Jr.
Anna E. Steinbock

Inventor
Harry Shoemaker
By Cornelius D. Ehret
Attorney

H. SHOEMAKER.
CONVERTER.
APPLICATION FILED DEC. 20, 1906.
899,629.
Patented Sept. 29, 1908.
2 SHEETS—SHEET 2.
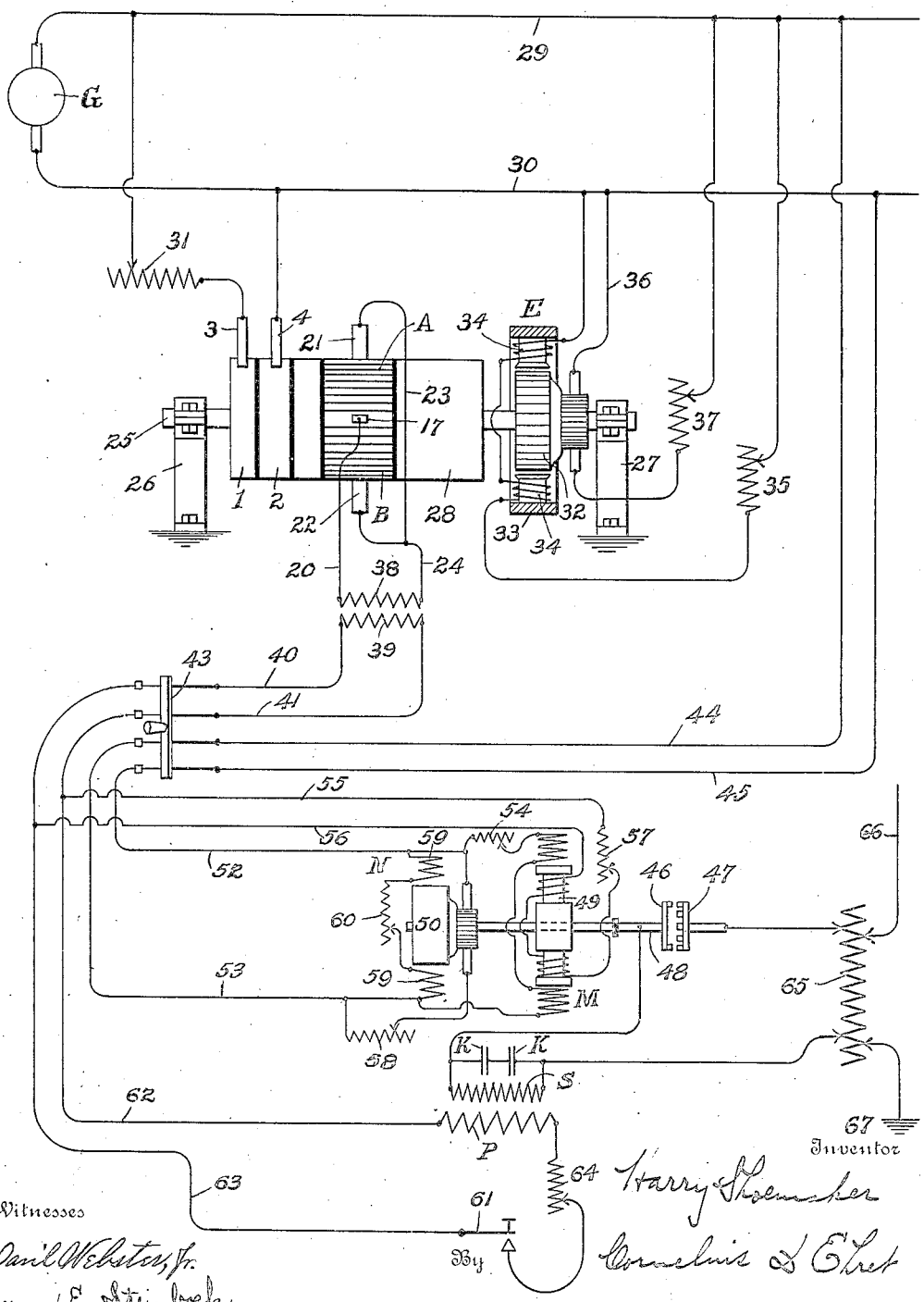

UNITED STATES PATENT OFFICE.

HARRY SHOEMAKER, OF JERSEY CITY, NEW JERSEY, ASSIGNOR TO INTERNATIONAL TELEGRAPH CONSTRUCTION COMPANY, A CORPORATION OF NEW YORK.

CONVERTER.

No. 899,629.  Specification of Letters Patent.  Patented Sept. 29, 1908.

Application filed December 20, 1906. Serial No. 348,715.

*To all whom it may concern:*

Be it known that I, HARRY SHOEMAKER, a citizen of the United States, residing at Jersey City, in the county of Hudson and State of New Jersey, have invented a new and useful Converter, of which the following is a specification.

My invention relates to apparatus for deriving from direct or continuous electric current, fluctuating or alternating current.

The apparatus comprises means in the nature of a commutator, rotated at suitable speed, resistances or inductances, or both, being employed to secure rounded wave forms which are more desirable on the alternating current side and which also increase the efficiency of conversion.

The converter does not involve field magnets and is so differentiated from rotary converters or motor generators which are dynamo electric machines.

My invention resides also in wireless telegraph transmitting apparatus employing such a converter which makes it possible to do away with motor generator sets, rotary converters, and the like, which require so much space especially on shipboard or other restricted places.

My invention resides also in further features hereinafter described and pointed out in the claims.

For an illustration of a form my invention may take reference is to be had to the accompanying drawings, in which:

Figure 1 is a diagrammatic view illustrating a converter. Fig. 2 is a diagrammatic view illustrating the converter in combination with wireless telegraph transmitting apparatus.

Referring to Fig. 1, 1 and 2 represent slip rings upon which bear the brushes 3 and 4 respectively, and which connect to the direct or continuous current supply. From the slip ring 1 connection is made by the conductors 5 and 6 with the diametrically opposed commutator segments 7 and 8. Similarly, the slip ring 2 is connected by the conductors 9 and 10 with the diametrically opposed commutator segments 11 and 12. These commutator segments 7, 8 and 11, 12 divide the commutator proper into quadrants, each quadrant consisting of a plurality of narrower segments as, 13. These quadrants will, for the sake of convenience, be referred to as A, B, C, and D. The two segments next to the segment 7 are cross connected, and so are the successive pairs of segments, until all the segments of the halves of quadrants A and B, on either side of the segment 7, are cross connected in pairs. Similarly, the segments of the halves of quadrants C and D, on either side of the segment 8, are cross connected in pairs. And similarly, the halves of the quadrants A and C, on either side of the segment 12, are cross connected in pairs; and likewise the halves of the quadrants of the segments B and D, on either side of the segment 7, are cross connected in pairs. Similars of the halves of quadrants on either side of the segment 7 are cross connected with similars of the halves of the quadrants C and D on either side of the segment 8. And similars of the halves of quadrants B and D on either side of segment 11 are cross connected with similars of quadrants A and C on either side of segment 12.

The neighboring halves of each quadrant are in electrical communication with each other through the relatively high resistance 14 through the various cross connections. From the segment 7 to the most distant segments of the halves of quadrants A and B on either side of segment 7, extends the resistance 15 (inductive or non-inductive). This resistance is connected at suitable points with the various cross connections between the segments symmetrically located on either side of the segment 7. The amounts of resistances between the various cross connections may be determined by calculation or experiment and are so chosen as to size of conductor and as to resistance of the sections or increments that when the apparatus is rotated at suitable speed an alternating current wave of sine form is more or less nearly approximated. The same resistance, 15, serves for the halves of quadrants C and D on either side of the segment 8 because of the cross connections. Similarly, a resistance or inductance 16 is connected in sections with the various cross connections of the remaining half of the commutator.

Brushes 17 and 18 are cross connected by the conductor 19 and bear upon diametrically opposite points of the commutator, the conductor 20 forming one terminal of the alternating current side of the device. Similarly, the brushes 21 and 22 are cross connected by conductor 23 and bear upon diametrically opposite points of the commutator and on a diameter at right angles with the brushes 17 and 18. And the conductor 24 forms the second terminal of the alternating current side. The commutator and slip rings and the inductances or resistances are all suitably mounted upon a shaft and rotated at desired speed, the direct current being fed in at brushes 3 and 4, and the alternating or fluctuating current taken off through the brushes 17, 18 and 21, 22.

The apparatus so mounted upon a shaft, is shown in Fig. 2, where a shaft is represented by 25, suitably supported in the bearings 26, 27. The various cross connections may be made within the commutator. And the resistances or inductances rotate with the shaft and commutator and are suitably inclosed within the commutator or within the extending cylindrical portion or member 28. Or the resistances may be external and stationary and slip rings and brushes provided to include them properly in circuit.

G represents a generator of direct or continuous current connected to the supply conductors 29, 30. The brush 3 is connected to the conductor 29 through the variable resistance 31, the brush 4 being connected to the conductor 30. To suitably rotate the converter, the direct current motor E is provided, its armature 32 being mounted upon the shaft 25 and its field ring 33 suitably supported and carrying the field poles 34. The field winding is connected on the one hand to conductor 30 and on the other through the variable resistance 35 to the conductor 29. The armature is connected through conductor 36 with the conductor 30 and through the rheostat or adjustable resistance 37 with the conductor 29.

The conductors 20 and 24 on the alternating current side of the converter, connect with the primary 38 of a transformer whose secondary is 39. The interposition of the transformer serves to produce, in its secondary circuit, a more truly alternating current. The secondary 39 is connected by the conductors 40 and 41 to two of the poles of the four-pole switch 43. And similarly, the direct current supply is connected by conductors 44 and 45 with the other two poles of the four-pole switch. This makes available then both direct and alternating current for the wireless telegraph transmitting apparatus involving a synchronously rotating spark gap, the spark gap terminals being represented at 46 and 47. This spark gap and its associated driving mechanism and circuits are similar to the apparatus shown and described in my copending application Serial No. 347,950.

The spark gap terminal 46 is rotated by the shaft 48 upon which are mounted the armatures 49 and 50 of the synchronous alternating current motor M and direct current motor N. The field winding 51 of the alternating current motor M is energized by direct current derived from the conductors 52 and 53, an adjustable resistance 54 intervening for control purposes. And the winding of the armature 49 receives alternating current through conductors 55 and 56, the adjustable resistance 57 intervening. The armature of the direct current motor N receives its current from the conductors 52 and 53 through the rheostat or adjustable resistance 58. And the field windings 59 receive current from the same conductors, an adjustable resistance 60 being provided in such field circuit.

With the motor E brought up to and maintained at suitable speed, the telegraph operator closes the four-pole switch 43 and by means of the rheostat 58 brings the direct current motor N up to suitable speed and the asynchronous motor M then maintains the speed precisely at synchronism, so that the spark gap terminals are rotated with respect to each other at synchronous speed. By adjusting the field or armature rheostats of the several motors, all desired control may be exercised, and by controlling the speed of the motor E, the frequency of the alternating current supply is determined, such motor being controlled by its armature and field rheostats in the well known manner. To transmit messages, after the apparatus is thus in motion, the operator manipulates his key 61 which then allows alternating current from conductors 62 and 63 to pass through the primary P of the transmitting transformer whose secondary is represented at S. A variable resistance or inductance 64 serves to properly control the current in the primary circuit. Bridged across the terminals of the secondary S, are the two condensers K, K which are included in series with the circuit of the spark gap 46, 47 and the inductance 65, a variable portion of which is included in this circuit and another variable portion of which is included between the aerial radiating conductor 66 and the earth 67.

By the herein described apparatus, alternating current may be efficiently derived from a direct current source without recourse to motor generators or rotary converters or other dynamo-electric machinery, which not only require much more space than the apparatus herein described but are also inefficient.

By the proper graduation and choice of the resistance (or inductance) sections or increments connected between the various cross connections of the commutator, the fluctuating or alternating current derived from conductors 20 and 24 may be made to very closely approximate a sine curve or any other curve. The inclusion of these resistance (or inductance) sections or increments render the conversion more efficient than in the case where the simple pole changing commutator is employed. And by the means of the driving mechanism, the frequency may be made anything desired, the flow of current from the direct current source is controlled by the adjustable resistance 31.

Altogether the apparatus is compact and a most efficient converter from direct to alternating current and is particularly adaptable to signaling in wireless telegraphy especially in constricted surroundings, as on shipboard, it being remembered that the current supply on shipboard is almost invariably direct current.

While I have herein shown and described a wireless signaling system and apparatus involving my converter, I do not herein make claim to said wireless signaling system and apparatus but reserve the same for another application.

What I claim is:

1. The combination with a converter, of a plurality of commutator segments, resistances in varying amounts connected between said commutator segments, brushes bearing upon said segments, and means for supplying direct current to said segments at symmetrical points.

2. A converter comprising a plurality of commutator segments, resistances in varying amounts connected between said segments, slip rings in communication with a direct current source, and connections from said slip rings to symmetrically located segments.

3. In a converter, a plurality of rotating commutator segments, resistances in varying amounts connected between said segments and rotating with said segments, brushes bearing upon said segments, slip rings communicating with a direct current supply, and connections from said slip rings to said symmetrically located segments.

4. The combination with a plurality of segments, of resistances in varying amounts connected between said segments, brushes bearing upon said segments, means for supplying direct current to symmetrically located segments, and means for rotating said segments and resistances at desired speed.

5. In combination, a converter comprising a plurality of commutator segments, resistances in varying amounts connected between said commutator segments, brushes bearing upon said segments, means for supplying direct current to said segments at symmetrical points, means for rotating said commutator, a direct current motor connected with a direct current supply, and an alternating current synchronizing motor associated with said direct current motor and deriving alternating current from said converter.

In testimony whereof I have hereunto affixed my signature in the presence of the two subscribing witnesses.

HARRY SHOEMAKER.

Witnesses:
E. F. DUFFY,
A. D. KNEUPER.